INVENTOR.
ALFRED G. EMSLIE
BY
William D. Hall.
ATTORNEY

Patented Nov. 11, 1952

2,617,983

UNITED STATES PATENT OFFICE 2,617,983

MOVING TARGET DETECTING SYSTEM

Alfred G. Emslie, Boston, Mass., assignor, by mesne assignments, to the United States of America as represented by the Secretary of War Application May 17, 1945, Serial No. 594,264

6 Claims. (Cl. 343—8)

The present invention relates to ultra-high frequency, pulse-echo, object-detection systems for identifying moving objects, and it relates more particularly to a system wherein a beat frequency between echoes from fixed objects and moving objects provides evidence for the existence of said moving objects.

In certain prior ultra-high frequency, pulse-echo radio object-location systems, it is often difficult to identify moving objects in the presence of ground clutter or interfering permanent echoes. Various methods have been devised for obviating this difficulty, many of these methods utilizing means for generating reference oscillations (continuous-wave or interrupted continuous-wave) synchronized to the transmitted exploratory pulse, means for determining the phase of the return echo-pulse carrier-frequency oscillations relative to the reference oscillations, and means for presenting this information either aurally or visually as evidence for the existence of a moving object.

As an object moves, the phase difference between the echo-pulse carrier-frequency oscillations, and the reference oscillations is progressive and varies from pulse to pulse. As an example: in one instance the reference oscillations may be in phase with the echo-pulse carrier-frequency oscillations, whereas in another instance the reference oscillations may be out of phase with the echo-pulse carrier-frequency oscillations. It becomes apparent that for a moving object (due to its changing range) the phase shift of the echo-pulse oscillations relative to the reference oscillations is periodic, and has a rate of change, or frequency, dependent upon the velocity of the reflecting object.

If then the echo-pulse, carrier-frequency oscillations are combined with reference oscillations which are synchronized to the transmitted pulse, the echo-pulse, carrier-frequency oscillations will periodically reinforce or oppose (in varying amount) the fixed, or reference oscillations, to give a series of video pulses which vary in amplitude in a corresponding periodic manner. This cyclical variation may be utilized as an indication of the presence, and also of the radial velocity of the moving object. The latter is true as the periodic phase shift, and hence cyclical variation of amplitude of the video pulses, has a frequency that is proportional to the velocity of the object relative to the radio object location system.

The reference oscillations may be provided either by a signal reflected from a fixed object, or by a synchronized local oscillator providing continuous-wave or interrupted continuous-wave oscillations. In general, systems of the first type (utilizing fixed object echoes) may be referred to as "noncoherent pulse-echo" systems, whereas those of the latter type (utilizing locally generated reference oscillations) may be called "coherent pulse-echo" systems. In either system velocity information, as well as the usual range and azimuth information, is provided.

One such coherent pulse-echo system is more fully described in the patent of Robert H. Dicke, No. 2,535,274.

It is an object of the present invention to provide an improved "noncoherent pulse-echo" system for detecting the presence of moving objects by comparing the phase of radio-frequency oscillations contained in an echo from said moving object, with those contained in an echo from a fixed object located at substantially the same range.

It is a further object of this invention to provide a system of the above type incorporating means for prolonging the reference signal emanating from a fixed object whereby, when the moving object momentarily moves through a region from which there are no strong fixed echoes, such gaps will be filled in and the moving object may be tracked continuously.

For a better understanding of the invention, together with other and further objects thereof, reference is had to the following description taken in connection with the accompanying drawing, wherein like parts are indicated by like reference numerals.

Figure 1:
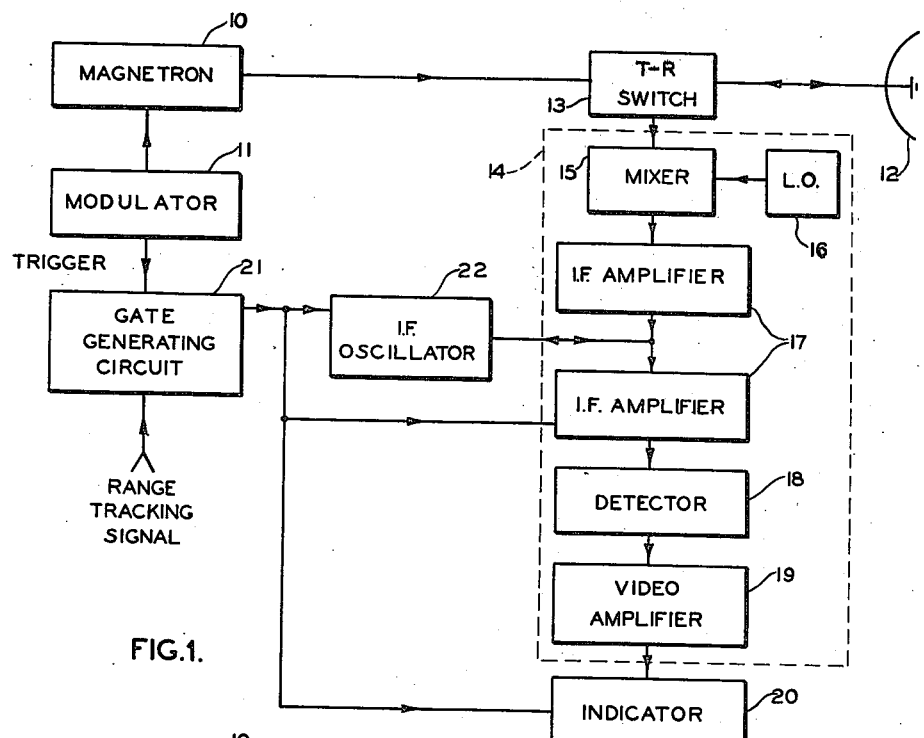
Figure 1 is a first embodiment of the present invention.

Referring now to the drawing and more particularly to Figure 1, a block diagram is shown of a noncoherent pulse-echo system for detecting the presence of moving objects. The transmitter is of conventional design and may comprise a magnetron oscillator 10 or other suitable oscillating means, and a modulator 11 which serves to energize magnetron 10 with high power surges of short duration. The output pulses of magnetron 10 are fed by a transmission line to directional antenna 12 through a transmit-receive switch 13 which functions to connect magnetron 10 to antenna 12, and disconnect the receiver 14 during the transmitted pulse. It reverses these connections during the interim between pulses when echoes are being received.

The receiver 14 may be of the super-heterodyne type comprising a mixer stage 15 having one input channel associated with transmit-receive switch 13, and the other with local oscillator 16. The output of local oscillator 16 consists of continuous-wave oscillations which are heterodyned with received echo-pulses to produce beat frequency echo-pulses which may be applied to a two-stage intermediate-frequency amplifier 17. A second input to amplifier 17 which modifies the amplifier output will presently be described. The intermediate-frequency echo-pulse output of intermediate-frequency amplifier 17 is fed to detector stage 18 which reproduces the envelope of said intermediate-frequency output as a video pulse.

The video pulse is impressed on a video amplifier 19 thereby raising the detected pulse voltage to the magnitude required to operate an indicator 20 which may be of the cathode ray oscilloscope type. The cyclical variation of video pulse amplitude will be clearly perceptible on the screen of said indicator. Aural indication may also be obtained if desired, by converting the video signal to an audio note.

A gate generating circuit 21 is associated with the intermediate-frequency amplifier 17 and provides a voltage which serves to sensitize receiver 14 at the instant a selected echo is received, and blank out the receiver at all other times, thereby eliminating unwanted echoes as well as other distracting signals. Gate generating circuit 21, which operates at the instant of arrival of the selected echo, is controlled by both a trigger pulse derived from modulator 11, at the instant of pulse transmission, and a range-tracking signal. By adjusting the range-tracking signal the position of the gating wave is displaced in accordance with the movement of the object. The gating wave is applied both to the intermediate-frequency amplifier 17, and to indicator 20; hence only the selected echo-pulse is seen on the indicator 20, all other signals being deleted. The gating wave is also applied to intermediate-frequency oscillator 22, the reason for this being hereinafter explained.

The output from gated intermediate-frequency oscillator 22, and the pulse output from the first stage of intermediate-frequency amplifier 17, are algebraically combined in the input circuit of the second stage of said amplifier.

Although the gating wave may be applied to the video stage, better results are obtained by gating one of the intermediate-frequency stages, as shown. As a result, a selected signal is combined with the oscillations from intermediate-frequency oscillator 22 whose operating frequency is identical with the resonant frequency of intermediate-amplifier 17. The combination of the intermediate-frequency echo-pulse and oscillations from intermediate-frequency oscillator 22 are then applied to the second stage of intermediate-frequency amplifier 17.

Separate gating of an intermediate-frequency stage assures that signals other than those chosen by the gating wave are suppressed and will not appear as a video indication. The amplitude of oscillation, and the "Q" of intermediate-frequency oscillator 22 is such that it will lock in phase with strong echoes from fixed objects. Oscillator 22 being locked in phase with a fixed object echo will therefore provide synchronized reference oscillations which are then applied to the second stage of intermediate-frequency amplifier 17 where they are combined with echo-pulses.

In the absence of fixed echoes, oscillator 22 will tend to continue to ring and provide reference oscillations that may be combined with the moving object echo. The proper operation of oscillator 22 is contingent upon the moving object echo, being of small intensity relative to the fixed object echoes so that the former will not lock-in the oscillator. To prevent oscillator 22 from locking in with the moving object echoes, when the moving object moves momentarily into a region where there are no fixed echoes, the gate voltage from gate circuit 21 is injected in oscillator 22 in a manner whereby the "Q" of said oscillator is elevated momentarily during the time the moving object echo is observed. Accordingly, oscillator 22 will not lock-in with the moving object echo, since its intensity is not sufficient to gain control over the oscillator.

The manner in which the "Q" of an oscillator can be varied by means of an injected voltage is well known in the art. The "Q" of an oscillator is dependent upon the "Q" of the resonant circuit thereof, which is, of course, dependent upon the resistance in said circuit. A change of resistance of the resonant circuit of an oscillator can be accomplished by shunting said circuit with an electron tube and varying the resistance of said tube by applying the gate voltage to an electrode thereof. Other circuits for performing this function are illustrated in my copending application, Serial No. 594,260, filed on even date herewith.

Figure 2:
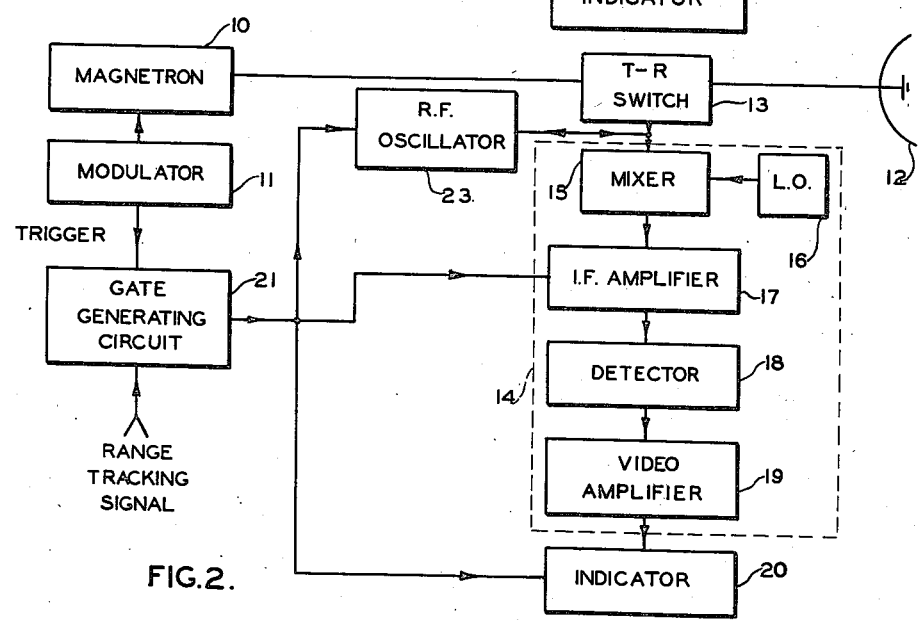
Figure 2 is a second embodiment of the present invention.

Referring now to Figure 2, a second embodiment of this invention is shown wherein the intermediate-frequency oscillator 22 shown in Figure 1 is operated at a radio-frequency level instead of an intermediate-frequency level. In the embodiment shown in Figure 2, a radio-frequency oscillator 23 is provided, the output of which is impressed upon the input of mixer 15. In all other respects the circuit is identical both in components and in operation with that shown in Figure 1.

Yet another method of operating the system at radio-frequency level is to employ a resonant cavity (not shown) or echo box as it is sometimes called, in lieu of oscillator 23, that will be excited by fixed echoes, and will ring and beat with the moving object echoes.

While there has been described what is considered preferred embodiments of the invention it will be manifest to those skilled in the art that various changes and modifications may be made therein without departing from the invention and it is therefore aimed in the appended claims to cover all such changes and modifications as fall within the spirit and scope of the invention.

What is claimed is:

1. Apparatus for identifying moving objects comprising means for transmitting exploratory pulses of radio frequency energy, a super-heterodyne receiver having an intermediate frequency amplifier for receiving echo-pulses from moving and fixed objects, an indicator associated with said receiver for displaying said echo-pulses, a gating generator associated with said indicator and said receiver for sensitizing same at a selected range and blanking same at all other times, an oscillator coupled to the intermediate-frequency amplifier of said receiver operating at a frequency substantially equal to the resonant frequency thereof, means for raising the "Q" of said oscillator at the instant said receiver is sensitized whereby said oscillator locks in phase only with said fixed object echo-pulses and mixes with said moving object echo-pulses to produce video pulses having a cyclical variation in amplitude.

2. Apparatus for identifying moving objects comprising means for transmitting exploratory pulses of radio frequency energy, means for receiving echo-pulses from moving and fixed objects, an indicator associated with said receiving means for displaying said echo-pulses, a gating circuit associated with said indicator and receiving means for sensitizing same at a selected range and blanking same at all other times, an oscillator connected to said receiver, and means for altering the "Q" of said oscillator when said receiver is sensitized by said gating circuit whereby said oscillator will lock in phase only with fixed object echoes and mix with moving object echoes to produce an indication of said moving objects.

3. The system of identifying moving objects comprising means for transmitting exploratory pulses of radio frequency energy, means for receiving echo-pulses from a fixed and moving object disposed at substantially the same range, means responsive to fixed object echo-pulses for generating oscillations in phase with the echo-pulses received from said fixed object, means for maintaining said oscillations and rendering them unsusceptible to locking-in with said moving object echoes in the momentary absence of said fixed object echoes, means for mixing said oscillations with moving object echo-pulses to produce video pulses having a cyclical variation in amplitude, and means for indicating said cyclical variation.

4. A moving object radar detection system comprising means for transmitting exploratory pulses of carrier wave energy, a superheterodyne receiver having an intermediate frequency amplifier for receiving echo-pulses from moving and fixed objects, means connected to said receiver for sensitizing said receiver at a selected range and blanking it at all other times, an oscillator for generating oscillations at said intermediate frequency coupled to said receiver, means for synchronizing said oscillator with the carrier waves of the received echo-pulses, means for increasing the "Q" of said oscillator only during the reception of echo-pulses from a desired moving object, whereby said oscillator locks in phase with the carrier waves of said fixed object echo-pulses but is prevented from locking in phase with the echoes from the desired moving object and the oscillations from said oscillator combine with the echo-pulses from said desired moving object to produce video pulses having a cyclical variation in amplitude.

5. A moving object radar detection system comprising means for transmitting exploratory pulses of carrier wave energy, a superheterodyne receiver having an intermediate frequency amplifier for receiving echo-pulses from moving and fixed objects, an oscillator for generating oscillations at said intermediate frequency coupled to said receiver, means for synchronizing said oscillator with the carrier waves of the received echo-pulses, and means for increasing the "Q" of said oscillator only during the reception of echo-pulses from a desired moving object whereby said oscillator locks in phase with the carrier waves of said fixed object echo-pulses but is prevented from locking in phase with the echoes from the desired moving object and the oscillations from said oscillator combine with the echo-pulses from said desired moving object to produce video pulses having a cyclical variation in amplitude.

6. A moving object radar detection system comprising means for transmitting exploratory pulses of carrier wave energy, means for receiving echo-pulses from a fixed and moving object located at substantially the same range, means for generating reference oscillations in phase with the carrier wave of echo-pulses received from said fixed object, means for momentarily decreasing the sensitivity of said last named means to echo-pulses received from a desired moving object to thereby prevent said reference oscillations from locking-in with the carrier waves of echo-pulses from said desired moving object, means for mixing said reference oscillations with oscillations from said desired moving object to produce video pulses having a cyclical variation in amplitude, and means for indicating said cyclical variations.

ALFRED G. EMSLIE.

REFERENCES CITED

The following references are of record in the file of this patent:

UNITED STATES PATENTS

| Number | Name | Date |
|---|---|---|
| 1,982,340 | Forbes | Nov. 27, 1934 |
| 2,152,618 | Wheeler | Mar. 28, 1939 |
| 2,253,589 | Southworth | Aug. 26, 1941 |
| 2,403,622 | Tuska | July 9, 1946 |
| 2,406,316 | Blumlein | Aug. 27, 1946 |
| 2,479,568 | Hansen | Aug. 23, 1949 |

FOREIGN PATENTS

| Number | Country | Date |
|---|---|---|
| 497,147 | Great Britain | Dec. 9, 1938 |